United States Patent
Pfalzgraf

(10) Patent No.: US 6,722,125 B1
(45) Date of Patent: Apr. 20, 2004

(54) METHOD FOR OPERATING AN INTERNAL COMBUSTION ENGINE

(75) Inventor: Bernhard Pfalzgraf, Ingolstadt (DE)

(73) Assignee: Audi AG (DE)

( * ) Notice: Subject to any disclaimer, the term of this patent is extended or adjusted under 35 U.S.C. 154(b) by 502 days.

(21) Appl. No.: 09/647,815

(22) PCT Filed: Apr. 8, 1999

(86) PCT No.: PCT/EP99/02362
§ 371 (c)(1),
(2), (4) Date: Nov. 14, 2000

(87) PCT Pub. No.: WO99/53176
PCT Pub. Date: Oct. 21, 1999

(30) Foreign Application Priority Data

Apr. 11, 1998 (DE) .......................... 198 16 276

(51) Int. Cl.⁷ ................................. F01N 3/00
(52) U.S. Cl. ..................... 60/295; 60/274; 60/276; 60/289; 60/285
(58) Field of Search .................. 60/274, 285, 286, 60/289, 301, 295, 276, 303, 284

(56) References Cited

U.S. PATENT DOCUMENTS

| | | | | |
|---|---|---|---|---|
| 4,199,938 A | * | 4/1980 | Nakase et al. | 60/289 |
| 5,473,890 A | * | 12/1995 | Takeshima et al. | 60/285 |
| 5,706,652 A | * | 1/1998 | Sultan | 60/274 |
| 5,722,236 A | * | 3/1998 | Cullen et al. | 60/274 |
| 5,746,049 A | * | 5/1998 | Cullen et al. | 60/289 |
| 5,778,666 A | * | 7/1998 | Cullen et al. | 60/285 |
| 5,832,722 A | * | 11/1998 | Cullen et al. | 60/274 |
| 6,101,809 A | * | 8/2000 | Ishizuka et al. | 60/285 |
| 6,105,365 A | * | 8/2000 | Deeba et al. | 60/274 |
| 6,119,450 A | * | 9/2000 | Boegner et al. | 60/274 |
| 6,161,377 A | * | 12/2000 | Boegner et al. | 60/285 |
| 6,293,094 B1 | * | 9/2001 | Schmidt et al. | 60/284 |
| 6,634,169 B1 | * | 10/2003 | Andersen et al. | 60/284 |

FOREIGN PATENT DOCUMENTS

| | | |
|---|---|---|
| EP | 469170 | 8/1990 |
| EP | 560991 | 10/1992 |
| EP | 580389 | 7/1993 |
| EP | 599061 | 10/1993 |
| EP | 636770 | 2/1995 |
| EP | 860595 | 2/1998 |
| EP | 869263 | 10/1998 |
| WO | 07497 | 2/1998 |
| WO | 27322 | 6/1998 |

* cited by examiner

Primary Examiner—Thomas Denion
Assistant Examiner—Tu M. Nguyen
(74) Attorney, Agent, or Firm—Stevens, Davis, Miller & Mosher, LLP

(57) ABSTRACT

In a process for operation of an internal combustion engine having a NOx storage catalytic converter, after desulfuration is required the mode of operation of the internal combustion engine is changed to $\lambda_1 < 1$ and secondary air is injected upstream from the NOx storage catalytic converter (4) during a first time interval $T_1$. After secondary air injection is interrupted, the internal combustion engine is operated at $\lambda_2 < 1$ during a second time interval $T_2$. Normal operation of the internal combustion engine is subsequently resumed. This process makes simple desulfuration of the NOx storage catalytic converter (4) possible (FIG. 1).

13 Claims, 1 Drawing Sheet

METHOD FOR OPERATING AN INTERNAL COMBUSTION ENGINE

The invention relates to a process for operating an internal combustion engine as specified in the preamble of claim 1 and to a device for application of the process.

BACKGROUND OF THE INVENTION

In the case of internal combustion engines, lean-mix operated Otto engines in particular, compliance with exhaust gas regulations requires reduction of the nitrogen oxide (NOx) component. Either NOx storage catalytic converters or DeNOx storage catalytic converters are used in the exhaust system. NOx storage catalytic converters store the NOx present in exhaust gas and release it under certain operating conditions ($\lambda<1$). Desorption of the NOx on the surface of the NOx storage catalytic converter at certain intervals is necessary, since the storage capacity of NOx storage catalytic converters is limited. In order to remain within the exhaust gas limits during NOx regeneration, in the downstream catalytic converter component the NOx released is reduced and the reduction agents HC and CO which are not completely converted are oxidized. A device such as this is disclosed in EP 560991.

One disadvantage of the state-of-the-art storage catalytic converters is that their NOx storage capacity decreases over time as a result of sulfur deposits, chiefly in sulfate form and the operating efficiency and as a result the operating efficiency of the entire exhaust gas system is significantly impaired. It is not possible to remain within exhaust gas limits with "sulfur-contaminated" NOx storage catalytic converters. Sulfur deposits are determined by the sulfur fraction of fuel.

Desorption of sulfur from the surface of the NOx storage catalytic converter is known to be theoretically possible. This process is designated as desulfurization in what follows. A prerequisite for the process is that the NOx storage catalytic converter be at a specific temperature and that a reducing environment (sufficient HC and CO) be present at the same time.

However, these conditions can be fulfilled only after prolonged operation of the internal combustion engine under full load (or high partial load). Such an operating condition is vehicle-dependent or driver-dependent and thus highly unpredictable. It depends on a large number of conditions such as driver intent, traffic and road conditions, etc.

Along with the point in time, the duration of this mode of operation and thus the period of operation available for desulfuration are of course also constantly unpredictable.

Desulfuration of a NOx storage catalytic converter on the basis of full-load or high partial-load operation is not possible for every vehicle with the regularity required.

Hence it is possible that the operating efficiency of a NOx storage catalytic converter may be greatly impaired by sulfur deposits and that the NOx component of exhaust gas will rise sharply as a result.

The type of desulfuration of a NOx storage catalytic converter described above presents a number of disadvantages. Such desulfuration is extremely irregular and can be carried out only under very special operating conditions (full load or high partial load) accompanied by increased fuel consumption. While it is true that the condition of the NOx storage catalytic converter is monitored during operation, it is not possible to interpret the results to determine the origin of increased NOx emissions. In addition, a driver may be directed to drive under full load, but only rarely can this be realized.

BRIEF SUMMARY OF THE INVENTION

The object of the invention is to develop a process of operating an internal combustion engine which does not present the disadvantages indicated in the foregoing, a process by means of which desulfuration of a NOx storage catalytic converter is possible at all times, which requires no costly additional equipment for its application, and which is simple and cost effective in application. Another object of the invention is to develop a device for application of the process.

This object is attained by means of the features indicated in claims 1 and 13.

The essential idea of the invention is that, with a requirement set for desulfuration of the NOx storage catalytic converter, in an initial time interval $T_1$ operation of the internal combustion engine is set to a value $\lambda<1$ and at the same time secondary air is blown in upstream from the NOx storage catalytic converter in order to heat this catalytic converter. In a subsequent time interval $T_2$ the secondary air injection upstream from the NOx storage catalytic converter is interrupted and the internal combustion engine is operated at a value $\lambda_2<1$. Desorption proper of the sulfur on the surface of the NOx storage catalytic converter takes place during this second time interval $T_2$, since an adequate reducing atmosphere is now present.

The process corresponding to time intervals $T_1$ and $T_2$ may be repeated several times in succession. Normal operation of the internal combustion engine is resumed when the desulfuration has been completed.

The essential advantage of the process claimed for the invention is represented by the circumstance that desulfuration is carried out automatically, the necessary measures can be carried out over a broad range of operating conditions of the internal combustion engine, and at the same time the process has no noticeable effect on the performance of the internal combustion engine. The driver will not notice the desulfuration process.

Advantageous developments of the invention are indicated in the subsidiary claims.

BRIEF DESCRIPTION OF THE DRAWINGS

The invention is explained in detail with reference to an exemplary embodiment illustrated in the drawing, in which.

DETAILED DESCRIPTION OF THE PREFERRED EMBODIMENT

Figure 1:
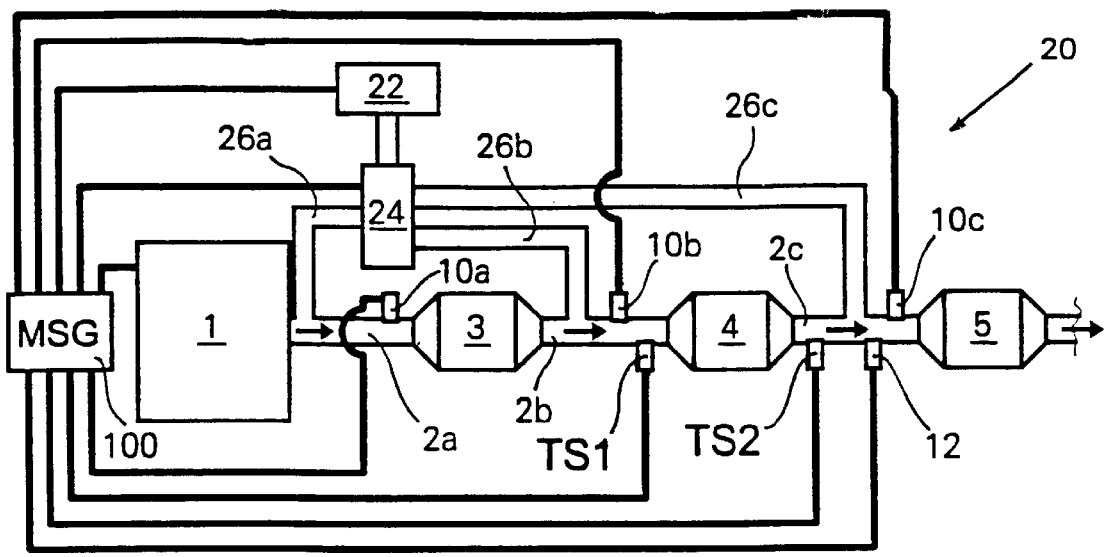
FIG. 1 presents a diagram of an internal combustion engine with two three-way catalytic converters and a NOx storage catalytic converter mounted between them, FIG. 2 an internal combustion engine as shown in FIG. 1, with cooled connecting lines, and FIG. 3 an internal combustion engine as shown in FIG. 1 with a bypass line.

An internal combustion engine with an engine 1 and an exhaust gas assembly 20 is shown in diagram form in FIG. 1. The exhaust gas assembly 20 consists of two three-way catalytic converters 3 and 5 between which a NOx storage catalytic converter 4 is installed.

The three-way catalytic converter 3, which serves as starting catalytic converter, is connected to the engine 1 directly by a manifold 2a. A continuous oxygen sensor 10a is mounted upstream from the three-way catalytic converter 3. The three-way catalytic converter 3 may be designed optionally with or without an $O_2$ reservoir. It assumes the function of total conversion of pollutants until the NOx storage catalytic converter 4 reaches its operating temperature. In the startup phase the engine 1 is operated preferably with $\lambda=1$ or periodically $\lambda<1$ if necessary until the three-way catalytic converter 3 starts up.

The three-way catalytic converter 3 is connected to the NOx storage catalytic converter 4 by an input pipe 2b. A temperature sensor TS1 and a continuous oxygen sensor 10b are mounted in each input pipe 2b. The NOx storage catalytic converter 4 is connected to the three-way catalytic converter 5 by an input pipe 2c. Another temperature sensor TS2 and a conventional oxygen sensor 10c or optionally a NOx sensor 12 are mounted in the input pipe 2c.

A secondary air pump 22 with connecting lines 26a, 26b, 26c blows secondary air into the exhaust gas system 20. A selectable function valve 24 is used to determine the point of air injection, that is, whether secondary air is to be blown into the exhaust gas system 20 upstream or downstream from the three-way catalytic converter 3 or downstream from the NOx storage catalytic converter 4. The secondary air mass may also be controlled or regulated by way of the valve.

The secondary air pump 22 may be represented by an electric blower, a mechanical compressor, or a turbocharger. Delivery of air from one or more cylinders by disconnection of the fuel supply is also conceivable.

The secondary air mass may be determined with an air mass gauge (not shown), such as the air mass gauge for the engine air mass or a separate air mass gauge.

The secondary air mass may be regulated, for example, by means of the valve 24 or by timed activation of the secondary air pump 22.

The direction of flow of the exhaust gas stream is indicated by arrows.

Figure 2:
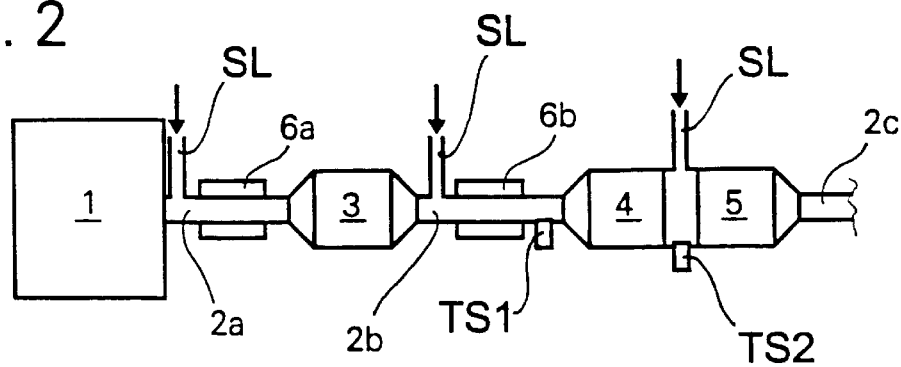
Figure 3:
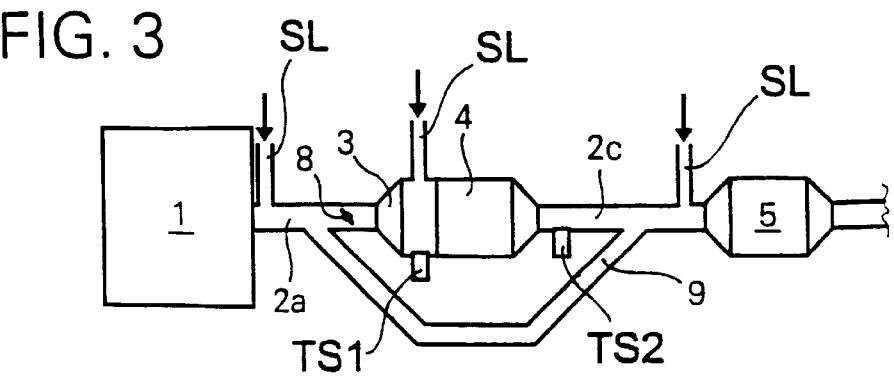

For the sake of clarity, only the secondary air intakes SL of the secondary air system and the location of the temperature sensors are indicated in FIGS. 2 and 3.

The internal combustion engine shown in FIG. 2, in contrast to that in FIG. 1, has a water cooling unit 6a or 6b on the manifold 2a or on the connection 2b between three-way catalytic converter 3 and NOx storage catalytic converter 4.

The water cooling serves to some extent to protect against thermal destruction of the NOx storage catalytic converter 4 in higher load ranges, since conventional storage materials exhibit extensive thermal aging at a maximum temperature of around 800° C.

In addition, the range of operation of the NOx storage catalytic converter 4 can be extended by means of water cooling. Effective NOx storage takes place only within a specific temperature range (approximately 200 to 450° C.). However, this maximum temperature is reached in lean-fuel operation even at a vehicle speed of about 70 km/hr. NOx storage is possible at even higher speeds if the exhaust gas is cooled.

The corresponding cooling devices, including the pertinent control unit, are not shown in detail.

Only the manifold 2a is provided with a water cooling unit 6a in one exemplary embodiment not shown in the drawing.

For considerations of space the NOx storage catalytic converter 4 and the three-way catalytic converter 5 are mounted in a single housing.

The internal combustion engine shown in FIG. 3 has a bypass line 9 by means of which the exhaust gases circumvent the first three-way catalytic converter 3 and the NOx storage catalytic converter 4 shown in FIG. 3 has a bypass line 9 with a connecting piece 9a by means of which the first three-way catalytic converter 3 or the NOx storage catalytic converter 4 are bridged. In this way the NOx storage catalytic converter 4 can be protected against overheating. A bypass valve 8 is used to control the exhaust gas flow.

In this exemplary embodiment the three-way catalytic converter 3 and the NOx storage catalytic converter 4 are mounted in a single housing.

The three-way catalytic converter 3 or 5 may also be in the form of a conical catalytic converter of metal and may be mounted in a common housing with the NOx storage catalytic converter 4 (not shown in the drawing).

All sensors and all control mechanisms are connected to an engine control unit 100. Sensor signals are interpreted in this engine control unit 100 and the corresponding control commands are sent from this unit to the control mechanisms.

The operation of the invention is described in detail below.

During operation of the internal combustion engine the operating capacity of the NOx storage catalytic converter 4 slowly decreases because of sulfur deposits. Consequently, the operating efficiency of the NOx storage catalytic converter 4 is monitored as described below.

The NOx emission of the engine 1 depends on the performance characteristics and may be determined by means of the engine control unit 100. The current assigned NOx storage capacity of the NOx storage catalytic converter 4 may also be determined on the basis of data stored in the engine control unit 100. If the readings of the NOx sensor 12 vary from the assigned values, the engine control unit 100 orders desulfuration of the NOx storage catalytic converter 4 (process step a).

The operating efficiency of the NOx storage catalytic converter 4 may optionally be monitored by means of the two oxygen sensors 10b and 10c. The oxygen sensor 10c downstream from NOx storage catalytic converter 4 indicates the $O_2$ concentration accurately even during NOx regeneration. The $O_2$ concentration process varies in NOx regeneration as a function of thermal aging and the extent of sulfur contamination. In both circumstances earlier "breakthroughs" of reduction agents HC and CO and faster changes in the $O_2$ concentration processes occur during NOx regeneration.

Demand for desulfuration by the engine control unit on the basis of this information is also possible.

Desulfuration is introduced by switching operation of the internal combustion engine to $\lambda_1<1$ (preferably $\lambda<<1$, e.g., 0.7–0.9) accompanied by injection of secondary air upstream from the NOx storage catalytic converter 4 during a first time interval $T_1$ (process steps b and c). For this purpose the secondary air pump 22 and the valve 24 are appropriately activated. This measure results in heating (exothermic reaction) of the exhaust gas flow downstream from the three-way catalytic converter 3. The exhaust gases thereby heated act to heat the NOx storage catalytic converter 4.

During the first time internal $T_1$ (process step c) care must be taken to ensure that the temperature of the NOx storage catalytic converter 4 remains within certain limits. On one side 800° C. should not be exceeded, while on the other the minimum desulfuration temperature should be distinctly higher than about 600° C.

During the first time interval $T_1$ the engine is controlled so that the temperature value (TS1), that is, the exhaust gas temperature upstream from the NOx storage catalytic converter 4, falls within the 750° C. to 800° C. range. If the maximum value of 800° C. is reached, value $\lambda_1$ is increased for a brief period, the advance angle is changed, or the secondary air amount is varied by timed activation in order to prevent further heating.

The exhaust gas temperature downstream from the NOx storage catalytic converter 4 also rises during time interval $T_1$. It is a gauge of the temperature in the interior of the NOx storage catalytic converter 4. Secondary air injection is interrupted as soon as the temperature value sensed by temperature sensor TS2 exceeds the minimum desulfuration temperature by a minimal value (about 100° C.).

Hence the first time interval $T_1$ continues until, for example, the temperature sensor TS2 senses the temperature value 700° C.

Interruption of secondary air injection upstream from the NOx storage catalytic converter 4 at the proper time protects the latter from overheating.

The exhaust gas temperature upstream and downstream from the NOx storage catalytic converter 4 can be controlled by use of two temperature sensors TS1 and TS2. The heat absorption and at the same time the temperature of the NOx storage catalytic converter 4 may be determined by comparison of the two temperature values TS1 and TS2. As an alternative, a temperature model may also be employed to determine these values upstream from the NOx storage catalytic converter 4 and to monitor the heating process appropriately, only one temperature sensor being used.

It is certainly expedient to adjust the total lambda value obtained by means of the secondary air injection upstream from or in the NOx storage catalytic converter 4 during secondary air injection upstream from the NOx storage catalytic converter 4, that is, during time interval $T_1$. This total lambda value should be greater than 1 and should preferably fall within the 1.05 to 1.2 range. This total lambda value may be affected either by engine operation or by way of the secondary air mass itself. In this process the engine control unit 100 controls the secondary air mass so that this total lambda value is obtained or the secondary air mass is controlled as a function of engine operation so that this total lambda value is also obtained.

The secondary air mass can be regulated by control of the valve 24 or timed activation of the secondary air pump 22.

The total lambda value is monitored by means of the continuous oxygen sensor 10b, which is mounted at the point of secondary air injection.

Secondary air injection during time interval $T_1$ results in oxygen enrichment ($\lambda>1$) in the exhaust gas unit 20 downstream from the point of injection. However, desulfuration is not possible in an oxygen-rich atmosphere. Consequently, injection of secondary air is interrupted upstream from the NOx storage catalytic converter 4 in a second time interval $T_2$, the internal combustion engine then operating at $\lambda_2<1$ (preferably $0.9<\lambda_2<0.99$) (process steps d and e). This results in a reducing atmosphere in the NOx storage catalytic converter 4 which makes desulfuration possible. Since secondary air injection does not take place during time interval $T_2$, the temperature of the NOx storage catalytic converter 4 drops to a point at which desorption of the sulfur is no longer possible for temperature reasons. If the temperature value of the temperature sensor TS2 drops below the minimum desulfuration temperature, process step 3 is interrupted and time interval $T_2$ consequently ends.

If the requirement for desulfuration is set, "definite" sulfur contamination is present. Breakdown of these definite sulfur deposits requires a specific time interval which is a function of the temperature of the NOx storage catalytic converter 4 and the air ratio $\lambda$ upstream from or in the NOx storage catalytic converter 4. This ratio corresponds to the supply of reducing agents (HC and CO). The amount of both is known or is continuously measured. Hence, for example, a minimum time for desulfuration as a function of exhaust gas temperature upstream from the NOx storage catalytic converter 4 and the $\lambda$ value upstream from the NOx storage catalytic converter 4 may be determined in the engine control unit 100.

If the minimum desulfuration time is not reached after one-time execution of process steps b to e, after process step e has been completed process steps b to e may be repeated (once or a number of times) until normal operation of the internal combustion engine is again sensed (process step f).

Switching to $\lambda_1$, $\lambda_2$ or normal operations is executed by the engine control unit 100 so that no torque discontinuities or other changes in vehicle performance occur which might be noticed by the driver.

In another exemplary embodiment secondary air injection between the NOx storage catalytic converter 4 and a downstream three-way catalytic converter 5 takes place during the second time interval $T_2$ ($\lambda_2<1$) for exhaust gas improvement during sulfur desorption. Valve 24 is activated as required for this purpose.

Consequently, secondary air injection is not interrupted after a temperature value of 700° C. is reached at temperature sensor TS2 but rather is continued by switching of valve 24 downstream from the NOx storage catalytic converter 4 and upstream from the three-way catalytic converter 5. As a result, the engine may be operated at $\lambda<1$ (preferably $0.9<\lambda\leq0.99$) and at the same time $\lambda=1$ can be achieved upstream from the three-way catalytic converter 5. The advantage in this instance is efficient conversion of pollutants HC and CO in the three-way catalytic converter 5 on the basis of the total lambda value $\lambda=1$ accompanied by rich-fuel operation of the engine for production of the reducing agents necessary for desulfuration of the NOx storage catalytic converter 4. Adjustment to $\lambda=1$ can be effected by timing the secondary air by means of a timing valve or in measurement of the amount of fuel by means of the engine control unit. The latter operates only if the secondary air mass is more or less constant and thus the operating conditions constant. This procedure is, on the other hand, faster for the purpose and more efficient for exhaust gas conversion.

The essential advantage of the process claimed for the invention is that it is very simple to carry out desulfuration of the NOx storage catalytic converter 4.

The object of the invention is also a device for application of the process as specified in the following claims.

What is claimed is:

1. A method of operating an internal combustion engine having a NOx storage catalytic converter, including:
   a) setting the requirement of desulfurization of the NOx storage catalytic converter;
   b) operating the internal combustion engine at $\lambda_1<1$ and injecting secondary air upstream from the NOx storage catalytic converter during a first time period;
   c) operating the internal combustion engine at $\lambda_1<1$, where $\lambda_2$ is larger than $\lambda_1$, and discontinuing the injection of secondary air during a second time period following the first time period;

d) resuming normal operation of the internal combustion engine.

2. A method as specified in claim 1, including repeating steps (b) and (c) after completion of method step (c).

3. A method as specified in claim 1, including operating the internal combustion engine during step (b) so that the temperature value of the upstream temperature sensor does not exceed a maximum value.

4. A method as specified in claim 1, including using lambda values of $0.7<\lambda_1<0.89$ and $0.9<\lambda_2<0.99$.

5. A method as specified in claim 1, including adjusting the injection of secondary air flow and operating the internal combustion engine to create a total lambda value ($\lambda_T$) greater than 1, preferably $1.05<\lambda_T<1.2$, prevailing upstream from the NOx storage catalytic converter during method step (b).

6. A method as specified in claim 1, including monitoring the NOx storage catalytic converter for sulfur deposits by means of a NOx sensor.

7. A method as specified in claim 1, including monitoring the NOx storage catalytic converter for sulfur pollutants using a continuous oxygen sensor mounted upstream and a conventional oxygen sensor mounted downstream from the NOx storage catalytic converter.

8. A method as claimed in claim 1, including switching off the secondary air injection upstream from the NOx storage catalytic converter as soon as a temperature value of an upstream temperature sensor exceeds a minimum desulfurization temperature plus a minimum value.

9. A method as specified in claim 1, including discontinuing the operation of the internal combustion engine at $\lambda_2<1$ during the second time period as soon as a temperature value of a downstream temperature sensor falls below a minimum desulfurization temperature.

10. A method as specified in one of claims 8 or 9, including assigning the minimum desulfurization temperature equal to 600° C. and assigning the minimum value equal to 100° C.

11. A method as specified in claim 1, including injecting secondary air during step (b) downstream from the NOx storage catalytic converter but upstream from a three-way catalytic converter located downstream from the NOx storage catalytic converter.

12. A method as specified in claim 11, including adjusting the injection of the secondary air flow and operating the internal combustion engine to create a total lambda value ($\lambda_T$) equal to 1 ($\lambda_T=1$) upstream from the three-way catalytic converter.

13. A internal combustion engine system comprising:
  a) an internal combustion engine having an exhaust system;
  b) a NOx storage catalytic converter in a path of the exhaust system;
  c) air injection means connected to the exhaust system for injecting air into an exhaust stream passing through the exhaust system; and
  d) control means for controlling the operation of the internal combustion engine and the air injection means; such that at a desulfurization requirement, for a first time interval the control operates the internal combustion engine at $\lambda_1<1$ and operates the air injection means to inject air into the exhaust stream, and for a second time interval the control operates the internal combustion engine at a $\lambda_2<1$ where $\lambda_2>\lambda_1$ and discontinues the air injection means from injecting air.

* * * * *